(12) United States Patent
Yang et al.

(10) Patent No.: US 9,322,348 B2
(45) Date of Patent: Apr. 26, 2016

(54) FUEL SYSTEM CANISTER PURGE CONTROL

(71) Applicant: Ford Global Technologies, LLC, Dearborn, MI (US)

(72) Inventors: Dennis Seung-Man Yang, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 14/069,164

(22) Filed: Oct. 31, 2013

(65) Prior Publication Data

US 2015/0120110 A1 Apr. 30, 2015

(51) Int. Cl.
*B60L 9/00* (2006.01)
*F02D 41/00* (2006.01)
*B60W 20/00* (2006.01)
*F02N 11/08* (2006.01)
*B60K 6/20* (2007.10)
*F02D 29/02* (2006.01)
*F02D 41/06* (2006.01)
*F02M 25/08* (2006.01)
*B60K 15/03* (2006.01)
*B60K 15/035* (2006.01)

(52) U.S. Cl.
CPC .............. *F02D 41/0032* (2013.01); *B60K 6/20* (2013.01); *B60W 20/40* (2013.01); *F02D 29/02* (2013.01); *F02M 25/089* (2013.01); *F02N 11/0833* (2013.01); *B60K 2015/0358* (2013.01); *B60K 2015/03427* (2013.01); *B60W 2510/244* (2013.01); *B60Y 2200/92* (2013.01); *F02D 41/062* (2013.01); *F02D 2200/0414* (2013.01); *F02D 2200/0606* (2013.01); *F02D 2200/501* (2013.01); *F02M 2025/0881* (2013.01); *F02N 2200/061* (2013.01); *F02N 2200/08* (2013.01); *Y10S 903/903* (2013.01)

(58) Field of Classification Search
None
See application file for complete search history.

(56) References Cited

U.S. PATENT DOCUMENTS

| 6,695,895 | B2 | 2/2004 | Hyodo et al. | |
|---|---|---|---|---|
| 7,913,677 | B2 | 3/2011 | Manookian, Jr. | |
| 2010/0094493 | A1* | 4/2010 | Atsumi | B60K 6/28 701/22 |
| 2011/0197850 | A1* | 8/2011 | Kawano | F02M 25/0836 123/294 |

OTHER PUBLICATIONS

Anonymous, "Method of Controlling Canister Temperature Using Piezo-Electric Material to Improve Emissions in HEV," IPCOM No. 000234770, Published Feb. 3, 2014, 4 pages.
Anonymous, "Carbon Canister With Internal Peltier Devices to Improve Hydrocarbon Desorption," IPCOM No. 000240795, Published Mar. 3, 2015, 2 pages.

* cited by examiner

*Primary Examiner* — Adam Alharbi
(74) *Attorney, Agent, or Firm* — James Dottavio; Alleman Hall McCoy Russell & Tuttle LLP

(57) ABSTRACT

Methods and systems are provided for improving canister purging during the limited engine operation time in a hybrid electric vehicle. Prior to a transition into an engine-on mode, a canister heater is operated to heat the canister to an optimum temperature based on vehicle operating conditions. Upon transition into the engine-on mode, fuel vapors released from the heated canister are purged to an engine intake.

18 Claims, 6 Drawing Sheets

FUEL SYSTEM CANISTER PURGE CONTROL

FIELD

The present description relates to systems and methods for improving a purging efficiency of a fuel system canister in a hybrid vehicle.

BACKGROUND AND SUMMARY

Hybrid vehicle fuel systems may include a fuel vapor canister packed with adsorbent for adsorbing fuel tank vapors. The fuel tank vapors adsorbed may include refueling vapors, diurnal vapors, as well as vapors released during fuel tank depressurization. By storing the fuel vapors in the canister, fuel emissions are reduced. At a later time, when the engine is in operation, the stored vapors can be purged into the engine intake manifold for use as fuel. However, in hybrid vehicle systems, due to the limited use of engine operation, there may not be sufficient time to purge all the fuel vapors to the canister. Accordingly, various approaches have been developed to expedite release of fuel vapors from a fuel system canister, particularly in hybrid vehicles.

One example approach is shown by Atsumi et al. in US 2010/0094493. Therein, a fuel vapor canister of a hybrid electric vehicle system is configured with a canister heater. The heater is operated when the vehicle is charged from an external source, so as to reduce the usage of charge from a system battery. Specifically, the canister is preheated by the heater while the vehicle is being charged with power from an external source and before an engine is operated.

However, the inventors have identified potential issues with such an approach. As one example, the approach of Atsumi does not allow for canister temperature control. Applicants have recognized that heating the canister to different temperatures at different operating conditions may improve the purging efficiency of the canister. For example, at higher temperatures (e.g., higher canister temperatures and/or higher ambient temperatures), the desorbing efficiency of the canister may be elevated and therefore substantial canister heating may not be required. As another example, at lower temperatures (e.g., lower canister temperatures and/or lower ambient temperatures), the adsorbing efficiency of the canister may by elevated and therefore substantial canister heating may be required.

In one example, some of the above issues may be at least partly addressed by a method for a hybrid vehicle system comprising: during vehicle travel, in response to an upcoming transition from an engine-off mode to an engine-on mode of vehicle operation, heating a fuel system canister before starting an engine. In this way, canister purging efficiency in a hybrid electric vehicle is improved.

As an example, a hybrid vehicle system may be configured with an engine and a system battery. A fuel system coupled to the engine may include a canister for storing fuel tank vapors, the canister configured with a heater. While the vehicle is operated in an engine-off mode, where the vehicle is propelled with energy from the system battery, vehicle operating conditions may be monitored to better anticipate an imminent transition to an engine-on mode. For example, one or more vehicle operating conditions such as battery state of charge, fuel tank fuel level, vehicle speed, torque demand, ambient temperature, etc., can be monitored to determine if vehicle propulsion via the engine is likely. If an engine-on mode is imminent, a canister heater may be operated, using energy from the battery, to heat the canister to a threshold temperature while the vehicle is propelled using motor torque. The threshold temperature to which the canister is heated may be based on vehicle operating conditions (such as battery state of charge, fuel tank fuel level, vehicle speed, torque demand, ambient temperature, etc.) as well as the prevalent canister temperature. For example, as the ambient temperature increases, the canister may be heated to a lower threshold temperature. As such, at the higher ambient temperature, reduced canister heating may be required due to the higher (inherent) desorption of fuel vapors from the warmer canister. In comparison, as the ambient temperature decreases, the canister may be heated to a higher threshold temperature due to the higher (inherent) absorption of fuel vapors into the cooler canister. Canister heating settings (e.g., power setting, duration of heating, et.) may be adjusted so that the canister is heated to the threshold temperature before the engine is started. During the subsequent engine restart, a canister purge valve may be opened and fuel vapors desorbed from the heated canister may be rapidly purged to the engine intake.

In this way, canister temperature control is improved. By adjusting canister temperature settings during vehicle travel based on an imminent transition to an engine-on mode, the impact of canister heating on the electric mode of vehicle operation is reduced. By heating the canister to a temperature based on vehicle operating conditions, fuel desorption is enabled more efficiently, improving vehicle battery usage and enabling canister purging to be performed using a smaller air mass. By heating the canister to a threshold temperature before the engine is restarted, canister purging can be enabled as soon as the engine is started. Furthermore, canister purging can be completed in a smaller amount of engine operation time. Overall, canister purging efficiency is improved without degrading the fuel economy of a hybrid vehicle system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
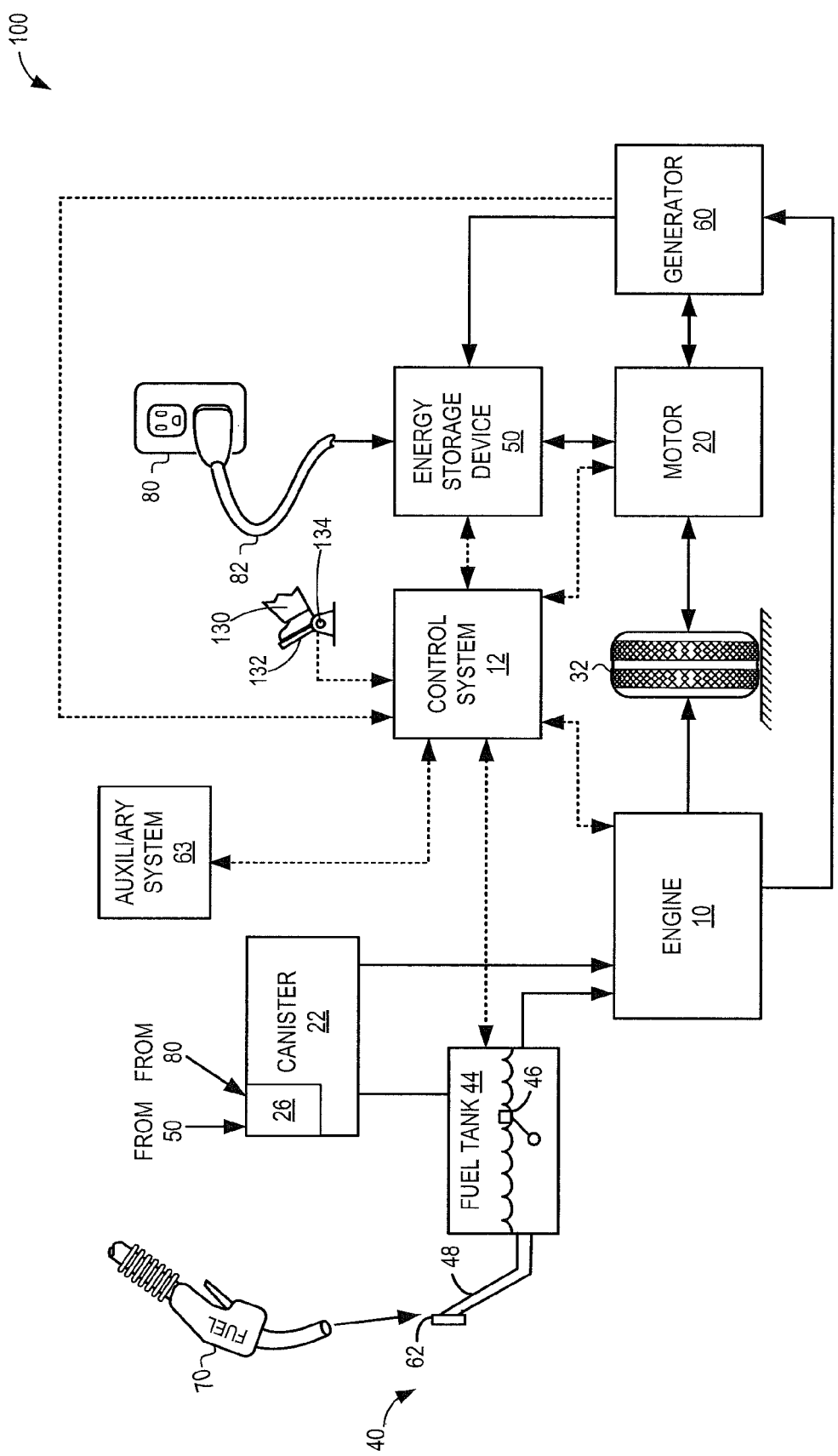
FIG. 1 shows an example hybrid vehicle system layout.
Figure 2:
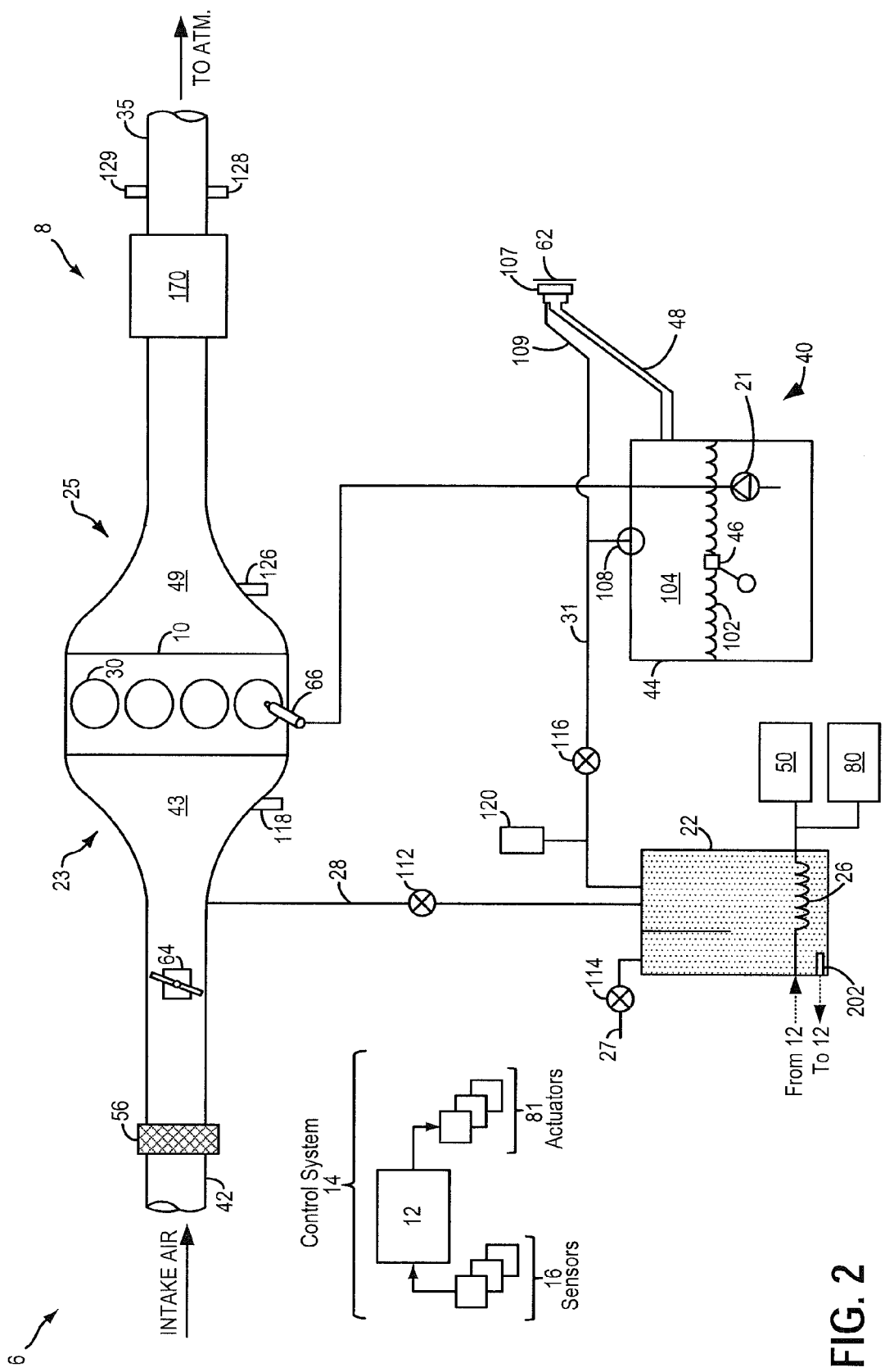
FIG. 2 shows an example embodiment of an engine system, including a fuel system, coupled in the vehicle system of FIG. 1.
Figure 5:
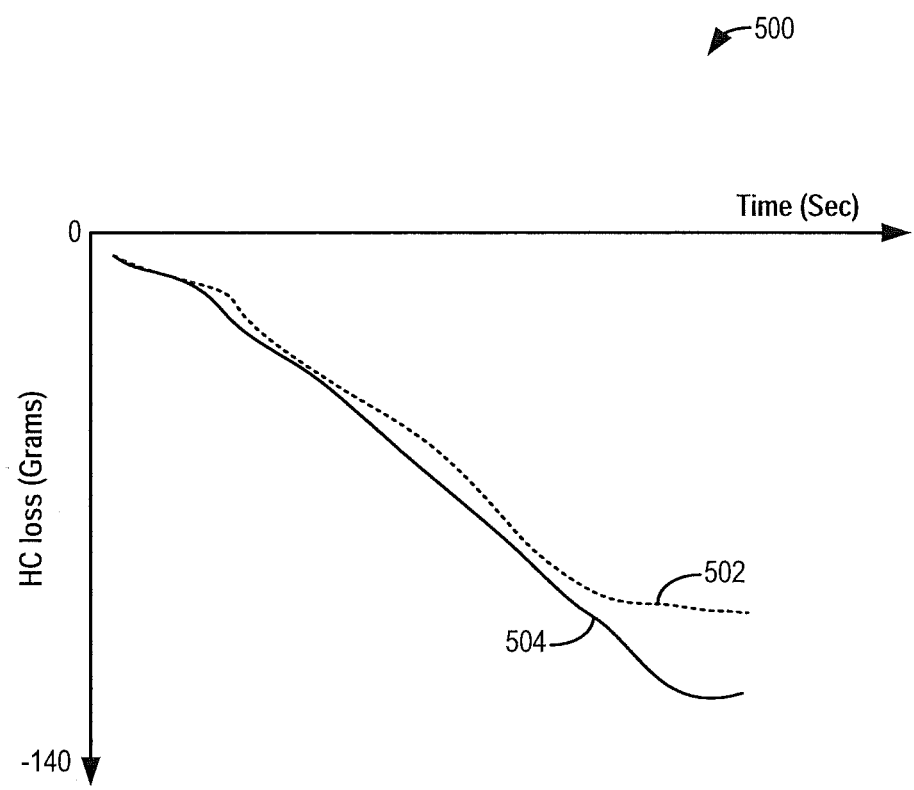
FIG. 5 depicts a map illustrating a relationship between canister purging efficiency and canister heating.
Figure 6:
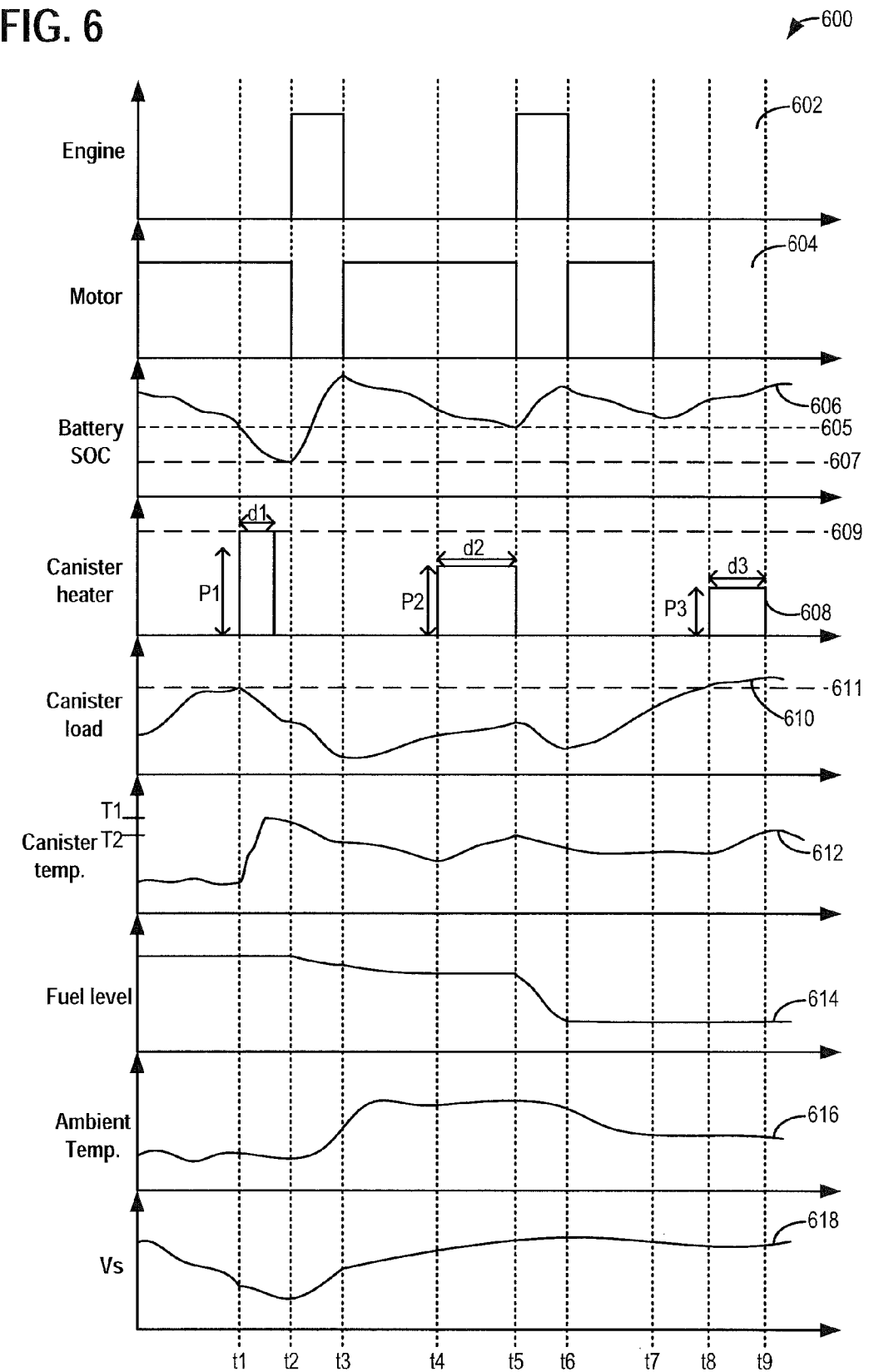
FIG. 6 illustrates an example canister heating operation to expedite canister purging in a hybrid vehicle system.

The following description relates to systems and methods for improving purging of a fuel system canister, such as in the engine fuel system of FIG. 2, coupled in a hybrid vehicle system, such as the plug-in hybrid electric vehicle of FIG. 1. A controller may be configured to perform a routine, such as the example routines of FIGS. 3-4, to operate a canister heater during vehicle travel in an electric mode. The heater may be operated in response to an imminent transition to an engine mode of vehicle operation. The canister is then heated to a threshold temperature that is based on various vehicle operating conditions to expedite desorption of fuel vapors from the canister (FIG. 5). Following canister heating, the heater is disabled and the engine is restarted. An example canister heating operation during vehicle travel is shown at FIG. 6. In this way, canister purging is improved without degrading hybrid vehicle performance.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 32 while engine 10 is deactivated.

During other operating conditions, engine 10 may be deactivated while motor 20 is operated to charge energy storage device 50 via regenerative braking. Therein, motor 20 may receive wheel torque from drive wheel 32 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 32 and convert the kinetic energy of the vehicle to electrical energy for storage at energy storage device 50. Energy storage device 50 may be, for example, a system battery or set of batteries.

During still other operating conditions, engine 10 may be operated by combusting fuel received from fuel system 40. For example, engine 10 may be operated to propel the vehicle via drive wheel 32 while motor 20 is deactivated. During other operating conditions, both engine 10 and motor 20 may each be operated to propel the vehicle via drive wheel 32. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 32. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator, for example, via a fuel gauge or indication lamp (not shown) on a dashboard of the vehicle system.

Vehicle system 100 may include a fuel door 62 located on an outer body of the vehicle for receiving fuel from an external fuel source. Fuel door 62 may be held locked during most vehicle operating conditions so as to contain fuel tank vapors and reduce the release of fuel tank hydrocarbons into the environment. Fuel system 40 may periodically receive fuel from the external fuel source. However, since engine 10 is periodically set to a deactivated state (or engine-off mode) where the consumption of fuel at the engine is significantly reduced or discontinued, long durations may elapse between subsequent fuel tank refilling events. During fuel tank refilling, fuel may be pumped into the fuel tank from fuel dispensing device 70 via a refueling line 48 that forms a passageway from fuel door 62.

Fuel vapors generated in fuel tank 44 due to diurnal events and refueling events may be directed to and stored in canister 22. The canister may include an adsorbent for storing the received fuel vapors. During selected engine operating conditions, fuel vapors may be desorbed from the canister and released into an engine intake for purging. As elaborated with reference to FIG. 2, canister 22 may include a canister heater 26 for selectively heating the canister to a threshold temperature, thereby expediting desorption of fuel vapors from the canister. This allows fuel vapors to be rapidly purged in the engine intake during the limited engine operation time of the hybrid vehicle system. Canister heater 26 may be operated using electrical energy from an energy storage device residing in the vehicle during vehicle travel, such as a system battery or energy storage device 50. Alternatively, canister heater 26 may be operated using electrical energy from an energy source residing outside the vehicle, such as power source 80.

Vehicle system 100 may include an auxiliary system 63. The auxiliary system may be, for example, a vehicle navigation system (such as a GPS), or an entertainment system (e.g., radio, DVD player, stereo system, etc.). In one example, where auxiliary system is a vehicle navigation system, location and time data may be transmitted between the control system 12 of the vehicle and a global positioning satellite via wireless communication.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

FIG. 2 shows a schematic depiction of an engine system 8 coupled in a hybrid vehicle system 6. In one example, hybrid vehicle system 6 is configured as vehicle system 100 of FIG. 1. As such, vehicle and engine components previously introduced in FIG. 1 are numbered similarly in FIG. 2 and not reintroduced.

Engine system 8 may include an engine 10 (such as engine 10 of FIG. 1) having a plurality of cylinders 30. Engine 10 includes an engine intake 23 and an engine exhaust 25. Engine intake 23 includes an air intake throttle 64 fluidly coupled to the engine intake manifold 43 via an intake passage 42. Air may enter intake passage 42 via air filter 56. Engine exhaust 25 includes an exhaust manifold 49 leading to an exhaust passage 35 that routes exhaust gas to the atmosphere. Engine exhaust 25 may include one or more emission control devices 170 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown), having an intake compressor driven by an exhaust turbine.

Engine system 8 is coupled to fuel system 40. Fuel system 40 includes a fuel tank 44 coupled to a fuel pump 21 and a fuel vapor canister 22. Fuel tank 44 receives fuel via a refueling line 48, which acts as a passageway between the fuel tank 44 and a refueling door 62 on an outer body of the vehicle. During a fuel tank refueling event, fuel may be pumped into the vehicle from an external source through refueling inlet 107 which is normally covered by a gas cap. During a refueling event, while fuel is pumped into fuel tank 44, one or more fuel tank vent valves may be opened to allow refueling vapors to be directed to, and stored in, canister 22.

Fuel pump 21 is configured to pressurize fuel delivered to the injectors of engine 10, such as example injector 66. While only a single injector 66 is shown, additional injectors are provided for each cylinder. It will be appreciated that fuel system 40 may be a return-less fuel system, a return fuel system, or various other types of fuel system.

In some embodiments, engine 10 may be configured for selective deactivation. For example, engine 10 may be selectively deactivatable responsive to idle-stop conditions. Therein, responsive to any or all of idle-stop conditions being met, the engine may be selectively deactivated by deactivating cylinder fuel injectors. As such, idle-stop conditions may be considered met if the engine is combusting while a system battery (or energy storage device) is sufficiently charged, if auxiliary engine loads (e.g., air conditioning requests) are low, engine temperatures (intake temperature, catalyst temperature, coolant temperature, etc.) are within selected temperature ranges where further regulation is not required, and a driver requested torque or power demand is sufficiently low. In response to idle-stop conditions being met, the engine may be selectively and automatically deactivated via deactivation of fuel and spark. The engine may then start to spin to rest.

Vapors generated in fuel tank 44 may be routed to fuel vapor canister 22, via conduit 31, before being purged to engine intake 23. Fuel tank 44 may include one or more vent valves for venting diurnals and refueling vapors generated in the fuel tank to fuel vapor canister 22. The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). In the depicted example, fuel tank 44 includes a passive fuel level vent valve (FLVV) 108 that includes a float mechanism which, when displaced by fuel, shuts off the vapor flow between the fuel tank and the canister. Thus, based on a fuel level 102 relative to vapor space 104 in the fuel tank, the vent valve may be open or closed. For example, FLVV 108 may be normally open allowing fuel tank overfilling to be prevented. During fuel tank refilling, when a fuel level 102 is raised, vent valve 108 may close, causing pressure to build in vapor line 109 (which is downstream of refueling inlet 107 and coupled thereon to conduit 31) as well as at a filler nozzle coupled to the fuel pump. The increase in pressure at the filler nozzle may then trip the refueling pump, stopping the fuel fill process automatically, and preventing overfilling.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23, specifically intake manifold 43, via purge line 28 by opening canister purge valve 112. While a single canister 22 is shown, it will be appreciated that fuel system 18 may include any number of canisters.

Canister 22 further includes a vent 27 (herein also referred to as a fresh air line) for routing gases out of the canister 22 to the atmosphere when storing, or trapping, fuel vapors from fuel tank 44. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. By closing canister vent valve 114, the fuel tank may be isolated from the atmosphere.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, in some embodiments, a fuel tank isolation valve (FTIV) 116 may be optionally included in conduit 31 such that fuel tank 44 is coupled to canister 22 via FTIV 116. When included, the isolation valve may be kept closed during engine operation so as to limit the amount of diurnal vapors directed to canister 22 from fuel tank 44. During refueling operations, and selected purging conditions, the isolation valve may be temporarily opened to direct fuel vapors from the fuel tank 44 to canister 22. By opening the valve when the fuel tank pressure is higher than a threshold (e.g., above a mechanical pressure limit of the fuel tank above which the fuel tank and other fuel system components may incur mechanical damage), the fuel tank vapors may be released into the canister and the fuel tank pressure may be maintained below pressure limits.

The reduce engine operation times may also reduce the time available for complete canister purging. As such, if the canister is not sufficiently purged during the available engine operation times, the storage ability of the canister is reduced, and exhaust emissions may be degraded. To improve canister purging, canister 22 may be fitted with a canister heater 26 for heating the canister and expediting release of fuel vapors from the adsorbent of canister 22 so that the released fuel vapors can be rapidly purged to the engine intake. In the depicted example, canister heater 26 includes a heater coil coupled inside canister 22. However, in alternate embodiments, canister heater 26 may be configured to heat canister 22 externally. Canister heater 26 may be operated with electrical energy received from an energy source on-board the vehicle system during vehicle travel. For example, canister heater 26 may be operated with electrical energy from a battery or energy storage device 50. Alternatively, such as when vehicle system 6 is being charged from an external power source, canister heater 26 may be operated with electrical energy received from power source 80 located outside of the vehicle.

Figure 3:
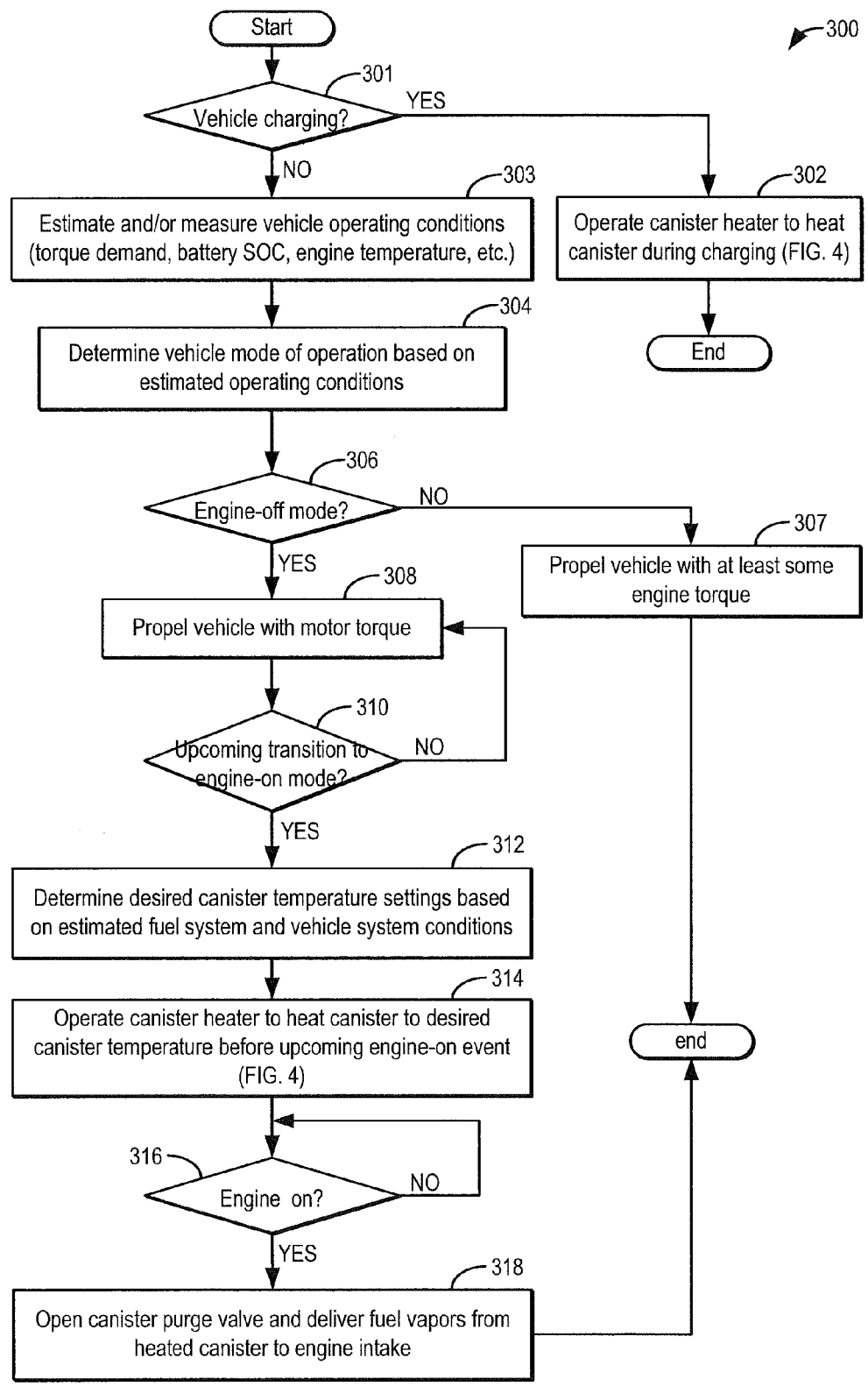
FIGS. 3-4 illustrate example methods for heating a fuel system canister to expedite canister purging in a hybrid electric vehicle.
Figure 4:
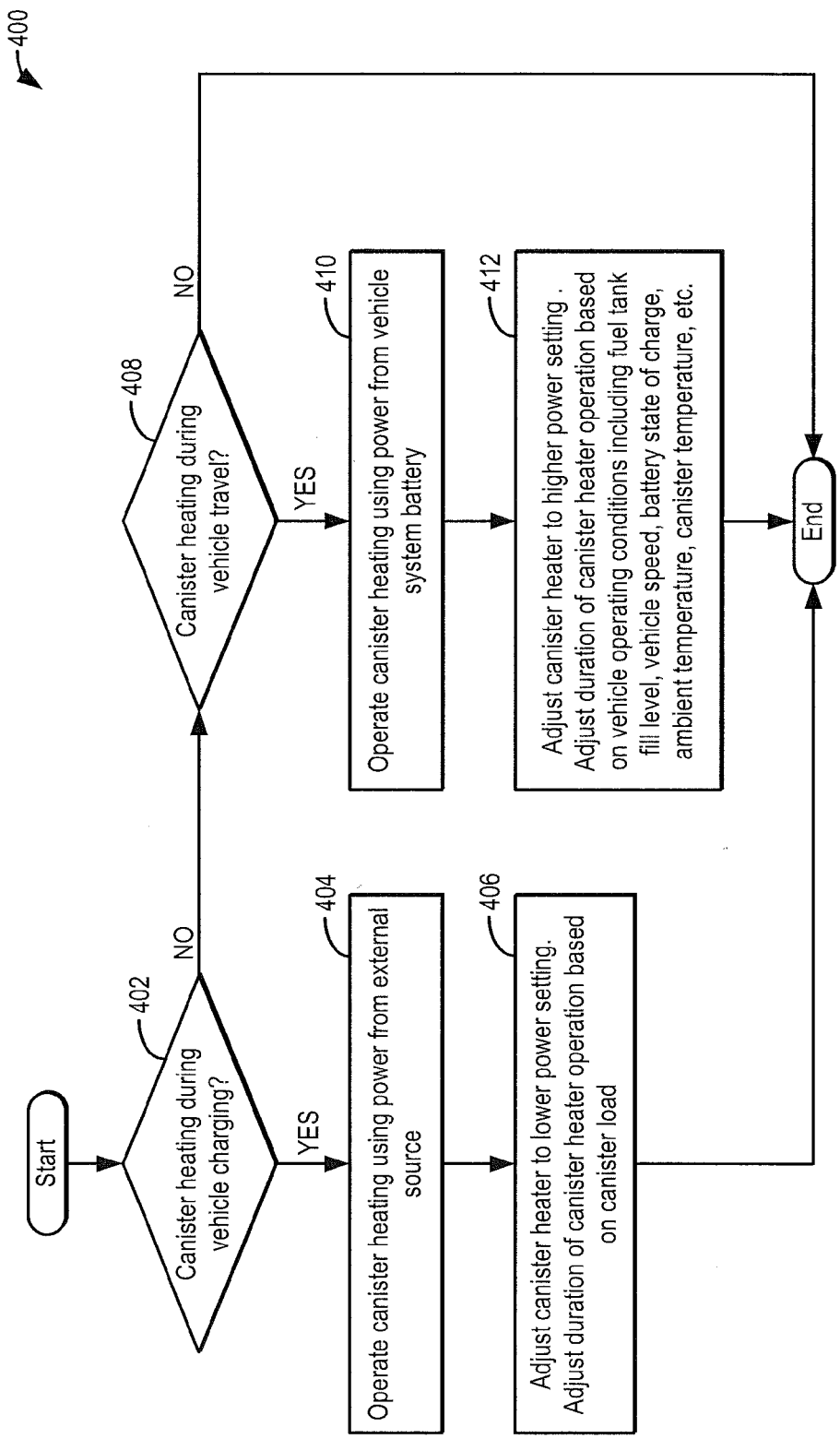

As elaborated with reference to FIGS. 3-4, canister heating may be enabled during vehicle travel in an electrical mode (with the vehicle being propelled using motor torque only, and with the engine deactivated) in response to an imminent transition to an engine mode (where the vehicle is propelled using engine torque). The imminent transition may be determined by a controller based on various vehicle operating conditions, such as based on a battery state of charge, fuel tank fill level, etc. Further, the canister heater may be operated to heat canister 22 to a threshold temperature that is based on the various vehicle operating conditions. For example, the canister heater may be operated for a shorter duration and/or at a lower power setting to heat the canister to a relatively lower threshold temperature when the ambient temperature is higher. Herein, due to the warmer ambient conditions, the canister's ability to desorb fuel vapors may already be enhanced and substantial canister heating may not be needed to completely purge the canister. As another example, the canister heater may be operated for a longer duration and/or at a higher power setting to heat the canister to a relatively higher temperature when the ambient temperature is lower. Herein, due to the cooler ambient conditions, the canister's ability to absorb fuel vapors may be enhanced and substantial canister heating may be needed to completely purge the canister. Canister temperature may be estimated by a temperature sensor 202 coupled to canister 22. Canister heating may be completed before the transition to engine mode such that the engine is restarted after the canister has been sufficiently heated and the canister heater has been disabled.

One or more pressure sensors 120 may be coupled to fuel system 40 for providing an estimate of a fuel system pressure. In one example, the fuel system pressure is a fuel tank pressure, wherein pressure sensor 120 is a fuel tank pressure sensor (or fuel tank pressure transducer FTPT) coupled to fuel tank 44 for estimating a fuel tank pressure or vacuum level. While the depicted example shows pressure sensor 120 coupled between fuel tank 44 and canister 22, in alternate embodiments, the pressure sensor may be directly coupled to fuel tank 44.

Fuel vapors released from canister 22 during a purging operation may be directed into engine intake manifold 43 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold air flow (MAF) may be obtained from MAF sensor 118 coupled to intake manifold 43, and communicated with controller 12. Alternatively, MAF may be inferred from alternate engine operating conditions, such as mass air pressure (MAP), as measured by a MAP sensor (not shown) coupled to the intake manifold.

Fuel system 40 may be operated by controller 12 in a plurality of modes by selective adjustment of the various valves and solenoids. For example, the fuel system may be operated in a fuel vapor storage mode wherein the controller 12 may close canister purge valve (CPV) 112 and open canister vent valve 114 and FTIV 116 to direct refueling and diurnal vapors into canister 22 while preventing fuel vapors from being directed into the intake manifold.

As another example, the fuel system may be operated in a refueling mode (e.g., when fuel tank refueling is requested by a vehicle operator), wherein the controller 12 may adjust the valves to depressurize the fuel tank before enabling fuel to be added therein. Therein the controller 12 may close CVV 114 and open each of CPV 112 and FTIV 116 to direct excess fuel tank pressure/vacuum into the intake manifold via the canister.

As yet another example, the fuel system may be operated in a canister purging mode (e.g., after an emission control device light-off temperature has been attained and with the engine running), wherein the controller 12 may open canister purge valve 112, canister vent valve 114, and close FTIV 116. By closing the FTIV, the canister can be purged more efficiently during the limited engine-on time that is available in a hybrid vehicle. During this mode, vacuum generated by the intake manifold of the operating engine may be used to draw fresh air through vent 27 and through fuel vapor canister 22 to purge the stored fuel vapors into intake manifold 43. In this mode, the purged fuel vapors from the canister are combusted in the engine. The purging may be continued until the stored fuel vapor amount in the canister is below a threshold or until the engine is deactivated and an electric mode of vehicle operation is resumed. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas (air/fuel ratio) sensor 126 located upstream of the emission control device, exhaust temperature sensor 128, MAF sensor 118, canister temperature sensor 202, and exhaust pressure sensor 129. Other sensors such as additional pressure, temperature, air/fuel ratio, and composition sensors may be coupled to various locations in the vehicle system 6. As another example, the actuators may include fuel injector 66, canister purge valve 112, canister vent valve 114, FTIV 116, canister heater 26, and throttle 64. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 3-4.

In this way, the systems of FIGS. 1-2 enable a method for heating a fuel system canister before starting an engine during vehicle travel, in response to an upcoming transition from an engine-off mode to an engine-on mode of vehicle operation.

Now turning to FIG. 3, an example routine 300 is shown for expediting purging of a fuel system canister in the limited engine operation time of a hybrid vehicle system by operating a canister heater.

At 301, it may be determined if the vehicle is charging. For example, it may be determined if the vehicle is stationary and plugged into an external power source. During the charging operation, a system battery or energy storage device of the vehicle system may be charged using power from the external power source. If the vehicle is not travelling, and is being charged, then at 302, the routine includes operating the canister heater using power from the external source during the charging to heat the canister in preparation for canister purging during subsequent engine operation. As elaborated at FIG. 4, the canister heater may be operated during the charging at a preset power setting, and/or for a preset duration that is independent of the vehicle conditions. For example, during a vehicle charging mode, the canister heater may be operated at a low setting so that the canister is heated mildly since there is no guarantee that the engine will be operated to enable a canister purge following the vehicle charging. Specifically, during vehicle charging, the canister heater may be operated to control the canister temperature to be a few degrees above ambient temperature.

If the vehicle is travelling, and not charging, then at 303, the routine includes estimating and/or measuring vehicle operating conditions. These may include, for example, operator torque demand, battery state of charge, engine temperature, fuel tank fill level, ambient conditions (e.g., ambient temperature, barometric pressure, and ambient humidity), etc. At 304, based on the determined vehicle operating conditions, a vehicle mode of operation may be determined. For example, it may be determined if the vehicle is to be propelled using motor torque from a system motor and/or energy storage device, using engine torque from a combustion engine of the system, or a combination of motor torque and engine torque. For example, at low load or low vehicle speed conditions, the vehicle may be propelled using motor torque only. In comparison, at higher loads or higher vehicle speed conditions, the vehicle may be propelled using engine torque only, or a combination of engine and motor torque.

At 306, it may be confirmed that the vehicle is travelling in an engine-off mode. If not, then at 307, the vehicle may continue to be propelled with at least some engine torque. If yes, then at 308, the vehicle be propelled with motor torque. At 310, during vehicle travel, it may be determined if there is an upcoming transition from the engine-off mode to an engine-on mode. That is, it is determined if an engine restart is imminent. The controller may receive an indication regarding the upcoming transition based on one or more (measured or estimated) vehicle operating conditions including a fuel tank fill level, a battery state of charge, a vehicle speed, an operator torque demand, and an ambient temperature, for example. As an example, an upcoming transition may be confirmed if the battery state of charge is lower than a threshold, the threshold based on (e.g., a function of, and higher than) a state of charge at which an engine has to be restarted. Herein, in response to low battery charge, vehicle propulsion via motor torque may need to be discontinued and vehicle propulsion via engine torque may be required. As another example, an upcoming transition may be confirmed if a fuel age or residence time of fuel in the fuel tank is higher than a threshold. Herein, engine operation may be initiated to consume the stale fuel even if engine operation is otherwise not required to meet the torque demand. As yet another example, an upcoming transition may be confirmed if the ambient temperature is higher than a threshold. Herein, engine operation may be anticipated in view of the potential need for cabin climate control.

At 312, in response to the upcoming transition from the engine-off mode to the engine-on mode of vehicle operation during vehicle travel, a desired canister temperature setting may be determined based on the estimated vehicle operating conditions. Specifically, a threshold temperature to which the canister is to be heated may be determined. The threshold temperature may be based on vehicle operating conditions such as fuel level, ambient temperature, current canister temperature, vehicle speed, and battery state of charge. For example, the optimal canister temperature may be determined as:

Desired canister temperature=f{fuel level, ambient temperature, vehicle speed, battery charge}

As such, the threshold temperature is adjusted to take into account the canister's enhanced ability to adsorb fuel vapors at cooler temperatures and enhanced ability to desorb fuel vapors at hotter temperatures. Map 500 of FIG. 5 depicts this relationship graphically. Specifically, map 500 depicts hydrocarbon desorption in grams (along the y-axis), over time (along the x-axis) for unheated air at plot 502 (dashed line) and for heated air at plot 504 (solid line). As shown, the heated air removes more grams of hydrocarbons in the same amount of time as the unheated air.

As an example, the threshold temperature may be increased as the ambient temperature decreases. As another example, the threshold temperature may be increased as the vehicle speed decreases. This is because at low vehicle speeds, or idle vehicle conditions, the fuel inside the fuel tank may vaporize more due to more heat rejection inside the tank. Consequently, at low vehicle speed conditions, the canister heater may be operated to increase the canister temperature and maximize purge efficiency. The threshold temperature may be further based on the fuel tank fill level as well as a current temperature of the canister as estimated by a temperature sensor coupled to (e.g., coupled in) the canister. For example, the threshold temperature may be increased as the current temperature of the canister decreases.

At 314, the routine includes heating the fuel system canister to the threshold temperature. Specifically, to heat the canister, a canister heater coupled in the canister may be operated using energy from a vehicle system battery, or other on-board energy storage device. As such, operating the canister includes adjusting a power setting and duration of operating the canister heater based on the one or more vehicle operating conditions. As elaborated at FIG. 4, the canister heater settings used to heat the canister during vehicle travel, and while the vehicle is operating in the engine-off mode, may be dependent on the vehicle operating conditions, and may be different from the settings used to heat the canister during vehicle charging. For example, the power setting of the canister heater may be increased as the vehicle speed decreases, the fuel tank fill level increases, the battery state of charge decreases, or the canister temperature decreases. In addition, canister heater power settings applied during vehicle travel may be higher than canister heater power settings applied during vehicle charging since an imminent engine-on mode is guaranteed during the vehicle travel condition but not guaranteed during the charging condition.

The fuel system canister is heated to the threshold temperature before starting the engine, that is, before the transition to the engine-on mode is performed. Thus after heating the canister to the threshold temperature, the canister heater is disabled, and after disabling the canister heater, the engine is restarted.

At 316, it may be confirmed if the engine has been restarted and the vehicle is in an engine-on mode. Upon confirmation, at 318, the routine includes, after starting the engine, opening a canister purge valve coupled between the canister and the engine intake manifold to release fuel vapors from the heater canister to the engine intake. By preheating the canister before the engine is started, a smaller air mass is required to purge the hydrocarbons from the canister to the engine intake. As such, this not only expedites canister purging, but also allows a smaller carbon canister to be used as well as lowering bleed emissions.

Now turning to FIG. 4, routine 400 compares canister heating operations performed during vehicle travel with those performed during vehicle charging.

At 402, the method includes confirming that canister heating has been requested during vehicle charging. In one example, canister heating may be requested during vehicle charging only if the canister load is higher than a threshold load. In another example, canister heating may be requested during vehicle charging independent of the canister load to take advantage of the canister heating opportunity. Herein, canister heating using a power source external to the vehicle, instead of the system battery, may be used even if the canister load is not high enough to initiate a purging request.

If canister heating during vehicle charging is confirmed, then at 404, the method includes operating the canister heater using power from an external power source. At 406, the method includes adjusting the canister heater to a lowest power setting possible. Alternatively, the canister heater may be set to a predefined (lower) external source power setting. A duration of operating the canister heater may be adjusted based on the canister load so as to allow fuel vapors to be desorbed in a minimum amount of time. Additionally, the canister may be mildly heated since an imminent engine-on mode following the vehicle charging is not confirmed.

Canister fuel vapors may be purged to the engine intake at a first opportunity following the vehicle charging, such as at a first engine-on event since the charging. In alternate examples, following the charging, even if sufficient battery charge is available, the engine may be restarted to allow the canister fuel vapors to be purged, following which the engine may be deactivated and the vehicle may be transitioned to an engine-off mode of vehicle operation. If the engine is always restarted following the charging, even if sufficient battery charge is available, or if it known a priori that the engine will be restarted following the vehicle charging, the canister heater setting used during the vehicle travel may be increased and the canister temperature may be increased to improve purge efficiency.

Returning to 402, if canister heating during vehicle charging is not confirmed, the method moves to 408 where it is confirmed if canister heating has been requested during vehicle travel. Canister heating may be requested during vehicle travel only if the canister load is higher than a threshold load. If canister heating during vehicle travel is confirmed, then at 410, the method includes operating the canister heater using power from an electrical energy source on-board the vehicle, such as from a system battery. At 412, the method includes adjusting the canister heater power setting and duration of canister heater operation based on the canister load and further based on vehicle operating conditions such as the fuel tank fill level, ambient temperature, vehicle speed, etc. The settings may be adjusted so as to heat the canister to a threshold temperature, as discussed at FIG. 3. This allows fuel vapors to be desorbed while reducing battery power consumption and without degrading hybrid vehicle performance in the engine-off mode. The power settings applied when heating the canister during vehicle travel may be higher than the power settings applied when heating the canister during vehicle charging since an imminent engine-on mode and purging opportunity is confirmed during the vehicle travel condition but not confirmed during the vehicle charging condition. As an example, a hybrid vehicle system may comprise an engine; a motor coupled to a battery; vehicle wheels propelled with torque from the motor and/or the engine; a fuel system coupled to the engine including a fuel tank and a canister; a temperature sensor coupled to the canister; and a canister heater coupled in the canister, the canister heater operated using power from the battery. The vehicle system may further comprise a controller configured with computer readable code for: before transitioning from propelling the wheels with only motor torque to propelling the wheels with only engine torque, operating the canister heater at a power setting for a duration to raise canister temperature from a current temperature estimated by the temperature sensor to a final temperature, each of the power setting, duration and final temperature based on vehicle operating conditions and the current temperature. Then, after the transitioning, the controller may be configured to open a valve to purge fuel vapors from the heated canister to the engine. The controller may include further instructions for estimating a time of the transitioning from propelling the wheels with only motor torque to propelling the wheels with only engine torque based on one or more of a battery state of charge, a fuel tank fill level, operator torque demand, vehicle speed, and ambient temperature.

Now turning to FIG. 6, example canister heating operations in a hybrid electric vehicle, in accordance with the present disclosure, are shown. Specifically, map 600 depicts engine operation at plot 602, motor operation at plot 604, a battery state of charge (SOC) at plot 606, canister heater operation at plot 608, canister load at plot 610, canister temperature at plot 612, fuel tank fill level at plot 614, ambient temperature at plot 616, and vehicle speed at plot 618.

Prior to t1, the hybrid vehicle system may be operating in an engine-off mode (plot 602) with vehicle wheels being propelled using motor torque only (plot 604) and with the vehicle operating at a higher vehicle speed (plot 618). During such time, a battery power may be used to propel the vehicle with a consequent drop in battery SOC (plot 606). Also prior to t1, diurnal fuel vapors may be collected and stored in a fuel system canister with a corresponding increase in canister load.

At t1, the battery SOC may drop to threshold 605. As such, threshold 605 may be a threshold indicative of an imminent or upcoming transition to an engine-on mode. However, the transition may not occur at threshold 605. Rather, threshold 605 may be based on, or a function of, a lower threshold 607 at which the transition actually occurs. Also around t1, the vehicle speed may drop to a lower speed and the canister load may be close to or at threshold 611, necessitating a canister purge.

At t1, in response to the drop in vehicle speed and a drop in battery SOC to threshold 605, and the resulting indication of an imminent engine reactivation, the canister heater may be operated (plot 608) at a power setting P1 and for a duration d1 to raise the canister temperature to a first higher temperature T1. Herein, the power setting P1 may be correspond to a maximum power setting 609 possible for the canister heater so as to maximize canister purging efficiency. As such, during the canister heating performed at t1, the ambient temperature (plot 616) may be lower and the canister's ability to desorb fuel vapors at the ambient temperature may be lower. In addition, due to the vehicle speed being lower (e.g., closer to an idling speed), more fuel tank vapors may be generated due to more heat rejection inside the tank. Therefore, the canister may need to be heated to the first higher temperature T1 by operating the canister heater for a shorter duration at a higher power setting. Between t1 and t2, battery power may be used to both operate the canister heater and propel the vehicle, resulting in a faster drop in battery SOC between t1 and t2, as compared to t0 to t1.

It will be appreciated that while the depicted example shows the canister heater being operated to raise the canister temperature to a higher temperature due to low vehicle speed, low canister temperature, and low battery state of charge, in alternate examples, the canister temperature may be increased due to any of a low vehicle speed, low canister temperature, and low battery state of charge condition.

The canister heater may be operated for duration d1 such that the canister is heated to a higher temperature T1 before t2. Once the desired canister temperature is reached, the heater may be disabled (before t2). Then, at t2, once the battery SOC has dropped to threshold 607, the engine may be restarted and the vehicle may be propelled using motor torque. During engine operation, a canister purge valve coupling the canister to the engine may be opened (not shown) and the fuel vapors desorbed from the heated canister may be rapidly purged to the engine intake with a corresponding drop in canister load. In addition, engine operation may be used to charge the battery to a higher SOC. At t3, once the battery has been sufficiently charged, and the canister has been sufficiently purged, the engine may be deactivated and the vehicle may be propelled with motor torque again.

At t4, it may be determined that the fuel tank fill level (plot 614) has remained above a threshold for a long duration (since t0) and that due to the long residence time of fuel in the tank, engine operation is required to reduce the fuel level. Therefore, at t4, an indication may be provided of an imminent engine restart. The canister load at t4 may not be high enough to necessitate a canister purge. However, in alternate examples, the canister load at t4 may be high enough or close to threshold 611 necessitating a canister purge. Accordingly, at t4, in response to the indication of an imminent engine restart, the canister heater may be operated to opportunistically purge canister fuel vapors from the canister to the engine during the upcoming engine operation. Specifically, at t4, the canister heater is operated at a power setting P2 and for a duration d2 to raise the canister temperature to a second lower temperature T2. Power setting P2 may be lower than power setting P1 used at t1, while duration d2 may be longer than duration d1 used at t1. As such, during the canister heating performed at t4, the ambient temperature may be higher and the canister's ability to desorb fuel vapors at the ambient temperature may be higher. Therefore, the canister may only need to be heated to the second lower temperature T2 by operating the canister heater at a lower power setting. In addition, the heating of the canister may be adjusted to be slower (extended between t4 and t5) so that the canister heating is completed at the same time as the engine is reactivated. Between t4 and t5, battery power may be used to both operate the canister heater and propel the vehicle, resulting in a faster drop in battery SOC. At t5, the desired canister temperature is reached, and the heater is disabled. Also at t5, the engine may be restarted and the vehicle may be propelled using motor torque. During engine operation, a canister purge valve coupling the canister to the engine may be opened (not shown) and the fuel vapors desorbed from the heated canister may be rapidly purged to the engine intake with a corresponding drop in canister load. In addition, engine operation may be used to opportunistically charge the battery to a higher SOC. At t6, following a duration of engine operation, the fuel tank fill level may drop to a level where further engine operation to consume stale fuel is not required. Accordingly, at t6, engine operation may be discontinued and the vehicle may resume being propelled with motor torque.

At t7, vehicle travel may be discontinued. For example, the vehicle may be parked in a garage. In addition, the vehicle may be coupled to an external power source so as to charge the vehicle battery. At t8, while the vehicle is being charged from the external power source, the canister heater may be opportunistically operated to heat the canister and desorb fuel vapors, irrespective of the canister load. However, since an engine-on event is not guaranteed following the vehicle charging (for example, after vehicle charging, on the subsequent vehicle-on event, the vehicle may be operated with motor torque only), at t8, the canister heater may be operated at a power setting P3 and for a duration d3 to only mildly heat the canister. Herein, the power setting P3 may be lower than power setting P1 (and P2) used during vehicle travel. The duration d3 may be adjusted so as to raise the canister temperature to a lower temperature T2 gradually. Following the vehicle charging, when the vehicle is launched and the engine is activated, the canister purge valve may be opened and the desorbed fuel vapors may be purged to the engine intake. In alternate examples, such as where the vehicle is always restarted with the engine-on, even if the battery is sufficiently charged, the power setting P3 applied during the vehicle charging condition may be increased and the canister temperature may be allowed to increase further (e.g., to T1).

In this way, during a first vehicle travelling condition, a controller may propel a vehicle with motor torque, and operate a canister heater at a first higher power setting for a first, shorter duration before restarting an engine. In comparison, during a second vehicle travelling condition, the controller may propel the vehicle with motor torque, and operate the canister heater at a second, lower power setting for a second, longer duration before restarting the engine. Herein, during the first travelling condition, the canister heater is operated to heat a fuel system canister to a first, higher temperature while during the second travelling condition, the canister heater is operated to heat the fuel system canister to a second, lower temperature. Further, during each of the first and second travelling conditions, the controller may disable the heater before restarting the engine. Likewise, during each of the first and second travelling conditions, after restarting the engine, the controller may open a purge valve coupled between the canister and the engine to purge fuel vapors from the canister to the engine.

In the above example, during the first vehicle travelling condition, an ambient temperature is lower while during the second vehicle travelling condition, an ambient temperature is higher. In another example, during the first vehicle travelling condition, a fuel tank fill level is higher while during the second vehicle travelling condition, the fuel tank fill lever is lower. In still another example, during the first vehicle travelling condition, a vehicle speed is lower while during the second vehicle travelling condition, the vehicle speed is higher.

In this way, a canister heater can be operated in response to an imminent engine-on event to sufficiently heat a canister. By adjusting the canister heater settings based on various vehicle operating conditions, including the canister's ability to adsorb or desorb fuel vapors at the prevalent vehicle operating conditions, release of fuel vapors from the canister is enabled more efficiently. By operating the canister heater before an imminent transition to an engine-on mode, the impact of canister heating on the electric mode of vehicle operation is reduced, improving electrical power usage on a hybrid electric vehicle. By pre-heating the canister before an engine-on event, canister purging can be completed in the limited engine operation time of a hybrid vehicle. In addition, the pre-heating of the canister reduces the air mass required to remove hydrocarbons from the canister. As such, this allows for the user of a smaller carbon canister, which provides component reduction benefits. In addition, bleed emissions can be reduced. Overall, canister purging efficiency in a hybrid vehicle system is improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid vehicle system method, comprising:
during vehicle travel,
in response to an upcoming transition from an engine-off mode to an engine-on mode of vehicle operation, indicated based on one or more vehicle operating conditions, heating a fuel system canister to a threshold temperature before starting an engine, the threshold temperature based on the one or more vehicle operating conditions, the threshold temperature increased as vehicle speed decreases and fuel tank fill level increases.

2. The method of claim 1, wherein the one or more vehicle operating conditions include one or more of a fuel tank fill level, a battery state of charge, a vehicle speed, an operator torque demand, and an ambient temperature.

3. The method of claim 1, wherein the threshold temperature is further based on a current temperature of the canister estimated by a temperature sensor coupled to the canister.

4. The method of claim 3, wherein the threshold temperature is increased as the current temperature of the canister decreases.

5. The method of claim 1, wherein heating the fuel system canister includes operating a canister heater coupled in the canister using energy from a vehicle system battery during vehicle travel while the vehicle is operating in the engine-off mode and while the vehicle is propelled with motor torque from the system battery.

6. The method of claim 5, wherein operating the canister heater includes adjusting a power setting and duration of operating the canister heater based on the one or more vehicle operating conditions.

7. The method of claim 6, wherein the power setting of the canister heater is increased as a vehicle speed decreases, and wherein the duration of operating the canister heater increases as the vehicle speed decreases.

8. The method of claim 5, further comprising, after heating the canister to the threshold temperature, disabling the canister heater, and after disabling the canister heater, starting the engine.

9. The method of claim 8, further comprising, after starting the engine, opening a canister purge valve to release fuel vapors from the heated canister to an engine intake.

10. A method for a hybrid vehicle system, comprising:
during a first vehicle travelling condition, propelling a vehicle with motor torque, while operating a canister heater at a first, higher power setting for a first, shorter duration before restarting an engine; and
during a second vehicle travelling condition, propelling the vehicle with motor torque, while operating the canister heater at a second, lower power setting for a second, longer duration before restarting the engine.

11. The method of claim 10, wherein during the first travelling condition, the canister heater is operated to heat a fuel system canister to a first, higher temperature and wherein during the second travelling condition, the canister heater is operated to heat the fuel system canister to a second, lower temperature.

12. The method of claim 11, further comprising, during each of the first and second travelling conditions, disabling the canister heater before restarting the engine.

13. The method of claim 12, further comprising, during each of the first and second travelling conditions, after restarting the engine, opening a purge valve coupled between the canister and the engine to purge fuel vapors from the canister to the engine.

14. The method of claim 10, wherein during the first vehicle travelling condition, an ambient temperature is lower and wherein during the second vehicle travelling condition, the ambient temperature is higher.

15. The method of claim 10, wherein during the first vehicle travelling condition, a fuel tank fill level is higher and wherein during the second vehicle travelling condition, the fuel tank fill level is lower.

16. The method of claim 10, wherein during the first vehicle travelling condition, a vehicle speed is lower and wherein during the second vehicle travelling condition, the vehicle speed is higher.

17. A hybrid vehicle system, comprising:
an engine;
a motor coupled to a battery;
vehicle wheels propelled with torque from the motor and/or the engine;
a fuel system coupled to the engine including a fuel tank and a canister;
a temperature sensor coupled to the canister;
a canister heater coupled in the canister, the canister heater operated using power from the battery; and
a controller configured with computer readable code for:
while propelling the wheels with only motor torque and before transitioning to propelling the wheels with only engine torque,
operating the canister heater at a power setting for a duration to heat the canister from a current temperature estimated by the temperature sensor to a final temperature, each of the power setting, duration and final temperature based on vehicle operating conditions and the current temperature, the final temperature increased as a vehicle speed decreases, a fuel tank fill level increases, or the current temperature decreases; and
after the transitioning,
opening a valve to purge fuel vapors from the heated canister to the engine.

18. The system of claim 17, wherein the controller includes further instructions for:
estimating a time of the transitioning from propelling the wheels with only motor torque to propelling the wheels with only engine torque based on one or more of a battery state of charge, the fuel tank fill level, operator torque demand, the vehicle speed, and ambient temperature; and
increasing each of the power setting and duration of operating of the canister heater as the vehicle speed decreases.

* * * * *